(12) United States Patent
Draghici

(10) Patent No.: US 7,556,545 B2
(45) Date of Patent: Jul. 7, 2009

(54) VARIABLE ANGLE OUTBOARD MOTOR SUPPORT

(75) Inventor: Adrian Draghici, Arlington, TX (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 11/498,629

(22) Filed: Aug. 3, 2006

(65) Prior Publication Data

US 2008/0029683 A1    Feb. 7, 2008

(51) Int. Cl.
| | |
|---|---|
| B63H 5/125 | (2006.01) |
| B63H 20/08 | (2006.01) |
| F16M 1/00 | (2006.01) |
| F16M 11/00 | (2006.01) |
| F16M 11/06 | (2006.01) |

(52) U.S. Cl. .................. 440/55; 440/113; 248/640; 248/642

(58) Field of Classification Search ......... 248/640–643; 440/55, 113, 53
See application file for complete search history.

(56) References Cited

U.S. PATENT DOCUMENTS

| | | | | |
|---|---|---|---|---|
| 2,939,670 | A | * | 6/1960 | Anderson .................. 248/351 |
| 3,693,576 | A | | 9/1972 | Driscoll |
| 3,941,344 | A | | 3/1976 | Paterson |
| 3,952,986 | A | | 4/1976 | Wells |
| 4,125,236 | A | | 11/1978 | Landwerlen |
| 4,331,431 | A | * | 5/1982 | Estes ........................... 440/53 |
| 4,438,899 | A | | 3/1984 | Perkins et al. |
| 4,650,427 | A | | 3/1987 | Huchinson |
| 4,651,964 | A | | 3/1987 | Kendrick |
| 4,685,888 | A | | 8/1987 | Brewer |
| 4,828,186 | A | | 5/1989 | Weiss |
| 4,842,239 | A | | 6/1989 | Kinsey et al. |
| 5,021,016 | A | | 6/1991 | Currey |
| 5,031,842 | A | | 7/1991 | Mohr |
| 5,393,251 | A | | 2/1995 | Gilbert |
| 5,525,082 | A | | 6/1996 | Lee et al. |
| 5,647,781 | A | | 7/1997 | Johnson, Sr. |
| D392,245 | S | | 3/1998 | Johnson, Sr. |
| 5,775,669 | A | | 7/1998 | Huggins et al. |
| 5,795,202 | A | | 8/1998 | Williams |
| 6,076,796 | A | | 6/2000 | Huggins et al. |
| 6,129,371 | A | * | 10/2000 | Powell ..................... 280/461.1 |
| 6,447,350 | B2 | * | 9/2002 | Thompson et al. ............ 440/55 |
| 6,513,782 | B2 | | 2/2003 | Fischer |
| 6,540,571 | B1 | | 4/2003 | Tolbert |
| 6,644,525 | B1 | * | 11/2003 | Allen et al. .................. 224/497 |

FOREIGN PATENT DOCUMENTS

JP    2-267095    10/1990

* cited by examiner

*Primary Examiner*—Ajay Vasudeva
(74) *Attorney, Agent, or Firm*—Hanley, Flight & Zimmerman, LLC

(57) ABSTRACT

An outboard motor support includes a trailer mount attachable to a trailer. A first arm extends from the trailer mount, and a second arm extends from an outboard motor and includes an outboard motor mount. The outboard motor support includes an adjustable coupling connecting the first arm and the second arm.

24 Claims, 4 Drawing Sheets

VARIABLE ANGLE OUTBOARD MOTOR SUPPORT

FIELD OF THE DISCLOSURE

The present disclosure relates generally to outboard motor supports for marine vehicles and, more specifically, to a variable angle outboard motor support for use during transportation of marine vehicles.

BACKGROUND OF RELATED ART

Many marine vehicles, such as boats with outboard motors, include a transom to support the outboard motor. The transom is typically a flat surface on the stern of a boat to which motor mounts attach, thereby holding the outboard motor and transmitting propulsion forces to the rest of the boat. Davits may be attached to the transom to allow dingys, inflatable rafts, and or other equipment to be carried on the boat. Ski-hitches, ski eyes (typically for ski towlines), lifting eyes, swim grids, platforms, and/or anchors may also be attached to the transom.

While the transom is typically constructed out of a material having sufficient strength to withstand towing forces, propulsion forces, and/or vibration forces during use and/or transportation of the boat, the transom is vulnerable to damage while the boat is towed behind an automobile with a trailer. In particular, an outboard motor is typically pivoted during trailer transportation of the boat to, among other things, reduce the aerodynamic drag profile of the boat and protect the outboard propeller from road contact and/or road debris. However, such a pivoted position may subject the transom to potentially damaging torsion/torque forces. To reduce the negative effect of these torsion forces, an outboard motor support, commonly referred to as a transom saver, is typically employed to transfer some of the forces from the outboard motor to the trailer.

Outboard motors, boats, boat hulls, and towing trailers are designed by a large number of manufacturers. As a result, a one-size-fits-all or universal transom saver to adequately protect the transom of a boat is very difficult to design. Additionally, while some transom savers function well with some motor/hull/trailer configurations, the transom saver may be rendered useless if the boat owner decides to install alternate peripherals or accessories to the transom. Peripherals and/or accessories may include, but are not limited to, davits, ski-hitches, ski eyes, lifting eyes, swim grids, platforms, and/or anchors. The addition of such peripherals and/or accessories to the transom may prevent the transom saver from connecting to locations of the trailer and/or outboard motor that enable safe and/or effective transfer of forces from the outboard motor to the trailer.

DETAILED DESCRIPTION

Figure 1:
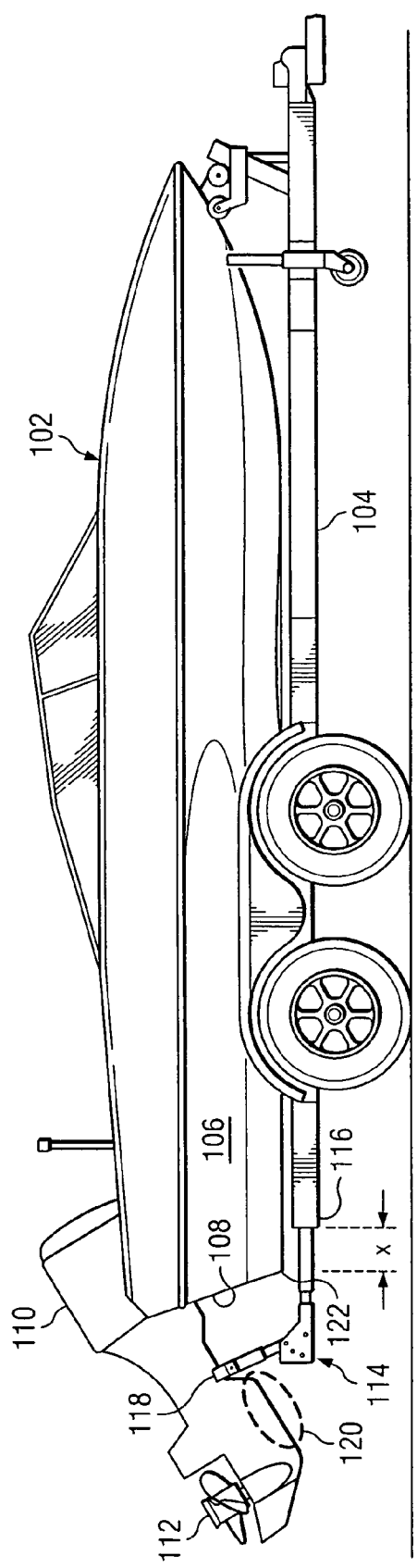
FIG. 1 is a side view of an example boat with an outboard motor secured to a trailer via an example adjustable angle outboard motor support.

Referring to FIG. 1, an example marine vehicle (i.e., boat) 102 is attached to a trailer 104 for towing behind an automobile (e.g., car, truck, etc.). The boat 102 includes a hull 106 with a transom 108 located at the rear or starboard end of the hull 106. An outboard motor 110 is mounted to the transom 108 and positioned (e.g., angled or tilted relative to the hull 106) in a manner to reduce aerodynamic drag and minimize or prevent damage to a propeller 112 during transport of the boat 102. One end of a variable angle motor support 114 is coupled or attached to a trailer end 116, and the other end of the variable angle motor support 114 is coupled or attached to the outboard motor 110, thereby distributing some of the torque load of the outboard motor 110 away from the transom 108 to the trailer 104.

More specifically, the illustrated example shows an outboard motor mount 118 coupled or connected to a portion of the outboard motor 110 outside a no-load zone 120 (illustrated by a dashed oval). The outboard motor mount 118 may be made of metal, wood, plastic, and/or a vibration dampening elastomeric material. The use of an elastomeric material may facilitate the absorption of shock forces that occur during transportation as a result of conditions during transport of the boat 102 such as, for example, bumps, uneven road surfaces, and/or bumps resulting from the trailer 104 rolling over road debris. A motor body and/or a motor shank may receive the motor mount 118 to prevent and/or minimize relative motion between the outboard motor 110 and the motor mount 118.

The outboard motor mount 118 may also be configured to include padded surfaces to protect the outboard motor 110 during transport. To minimize any relative motion between the outboard motor mount 118 and the outboard motor 110, transit straps (not shown) may be connected to the motor mount 118 to wrap-around or otherwise attach to the outboard motor 110. The motor mount 118 may be configured as a cradle yoke, a rigid brace (with or without padding), and/or a releasably securable adapter.

Some outboard motor manufacturers may designate various parts of the outboard motor 110 as no-load zones 120 that are susceptible to damage from forces they were not designed to handle. For example, the no-load zone 120 of FIG. 1 may be designed as a fin and/or wing to accommodate fluid forces only (i.e., where the boat 102 is in use in water). As such, the example outboard motor mount 118 is mounted safely above the no-load zone 120 to prevent damage to the outboard motor 110 while still providing relief to the transom 108 from rotational forces or torques due to the angled relationship between the outboard motor 110 and the transom 108.

The variable angle motor support 114 enables the outboard motor 110 to be supported by the trailer 104 in a manner that may not be possible using known transom savers. For example, many known transom saver configurations employ a single straight rigid bar that extends from a marine vehicle trailer to an outboard motor. Such configurations may limit the usefulness of the straight transom saver device and/or render it useless. In particular, a corner 122 where the transom 108 and the hull 106 intersect, extends a distance "x" beyond the trailer end 116 such that a transom saver without an angular shape would not be able to couple to the outboard motor 110 at an appropriate support location without contacting the corner 122. Even if a straight transom saver could span between the trailer end 116 and the outboard motor mount 118 location, the straight transom saver may still make contact with the corner 122, thereby resulting in damage to the hull 106 and/or the transom 108 damage due to road vibration and/or bumps during transportation of the boat 102.

In the illustrated example of FIG. 1, the variable angle motor support 114 is one of the arms rigidly mounted to the trailer 104 and extends in a substantially parallel direction from the trailer 104. However, without limitation, the motor support 114 may be mounted to the trailer 104 to enable a pivoting motion. For example, the variable angle motor support 114 may be mounted to the trailer 104 at the trailer end 116 with a ball-and-socket. The ball-and-socket configuration allows a user additional mounting arrangement opportunities while also allowing moment forces due to the outboard motor 110 weight to be transferred to the trailer 104, rather than to the transom 108.

Figure 2A:
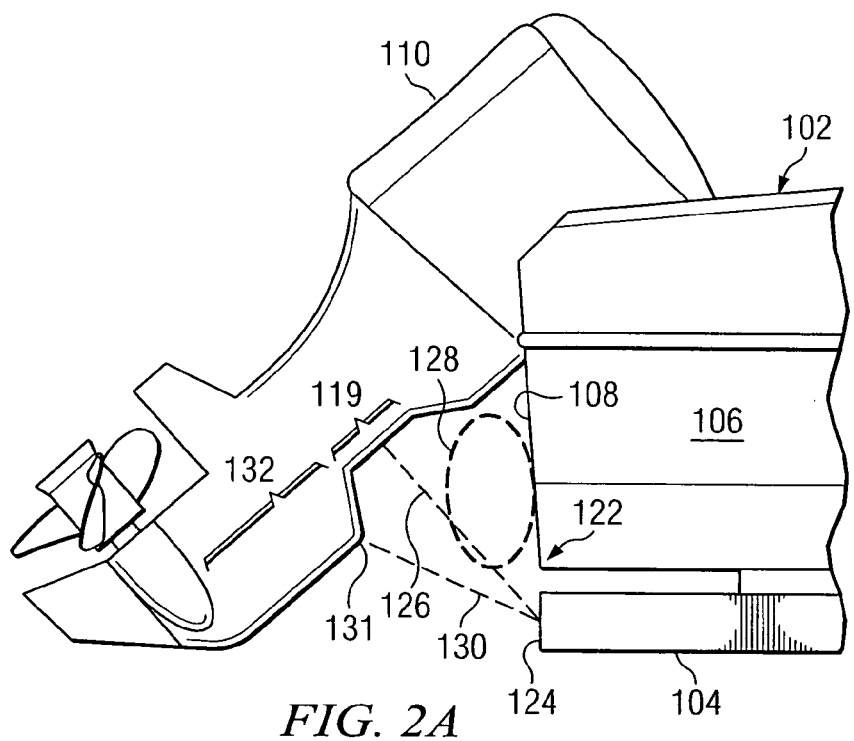
FIGS. 2A and 2B are side views of alternate example boats, outboard motors, and trailers employing example variable angle outboard motor supports.

FIG. 2A illustrates additional detail of the trailer-mounted boat 102 with the outboard motor 110. In the illustrated example, the trailer 104 is at least as long as the boat 102 so that a trailer end 124 is not obstructed or blocked by the corner 122. Accordingly, a straight transom saver configuration could span between the trailer end 124 and an outboard motor mounting zone 119 without interference by the transom 108 and/or the hull 106. However, if additional peripherals and/or accessories are installed on the transom 108, then a path taken by a straight transom saver may be obstructed, as shown by the dashed-oval 128. While an alternate straight path 130 may extend from the trailer end 124 to the outboard motor 110, an example transom saver endpoint that connects to the outboard motor 110 contacts a no-load zone 132, which may result in damage to the motor 110.

Figure 2B:
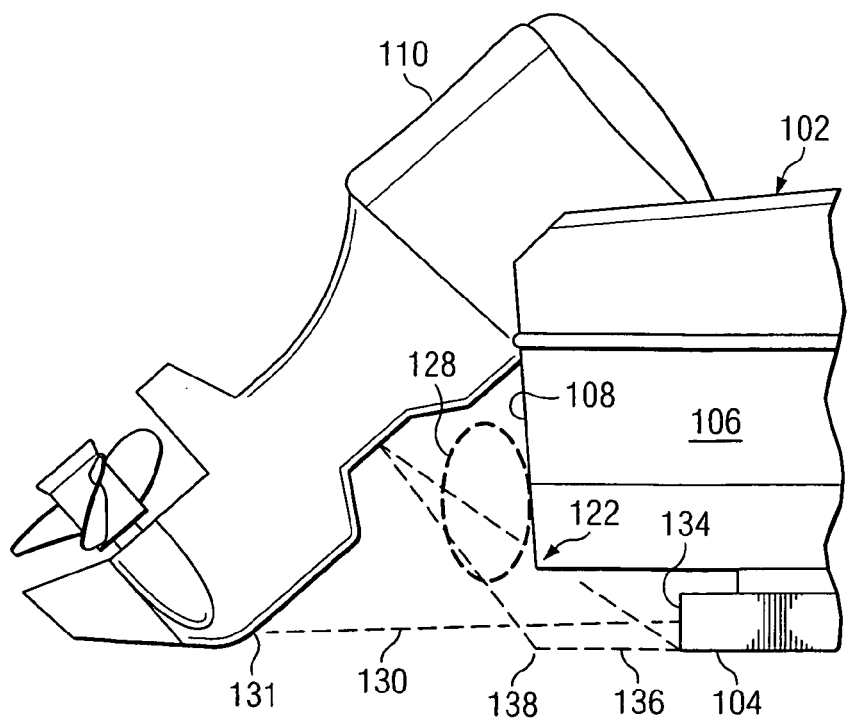

FIG. 2B illustrates additional detail of the trailer-mounted boat 102 with the outboard motor 110. In the illustrated example, the trailer 104 is shorter than the boat 102 so that a trailer end 134 is blocked or obstructed by the corner 122. Accordingly, while an example transom saver (illustrated by dashed line 136) having a preconfigured angle 138 may avoid contact with the corner 122, the example transom saver 136 may still interfere with peripheral and/or accessory equipment (illustrated by dashed-oval 128) installed on the transom 108.

In the illustrated example of FIG. 2B, while the preconfigured angle transom saver 136 may be rendered inoperable/ineffective due to subsequent addition of peripherals/accessories 128, a straight transom saver may also fail to properly mount to the outboard motor 110, as shown by the dashed line 130. For example, the straight transom saver 130 may contact the outboard motor 110 at a no-load location 131, resulting in potential damage to the outboard motor 110 upon force and/or vibrational forces being applied.

Figure 3:
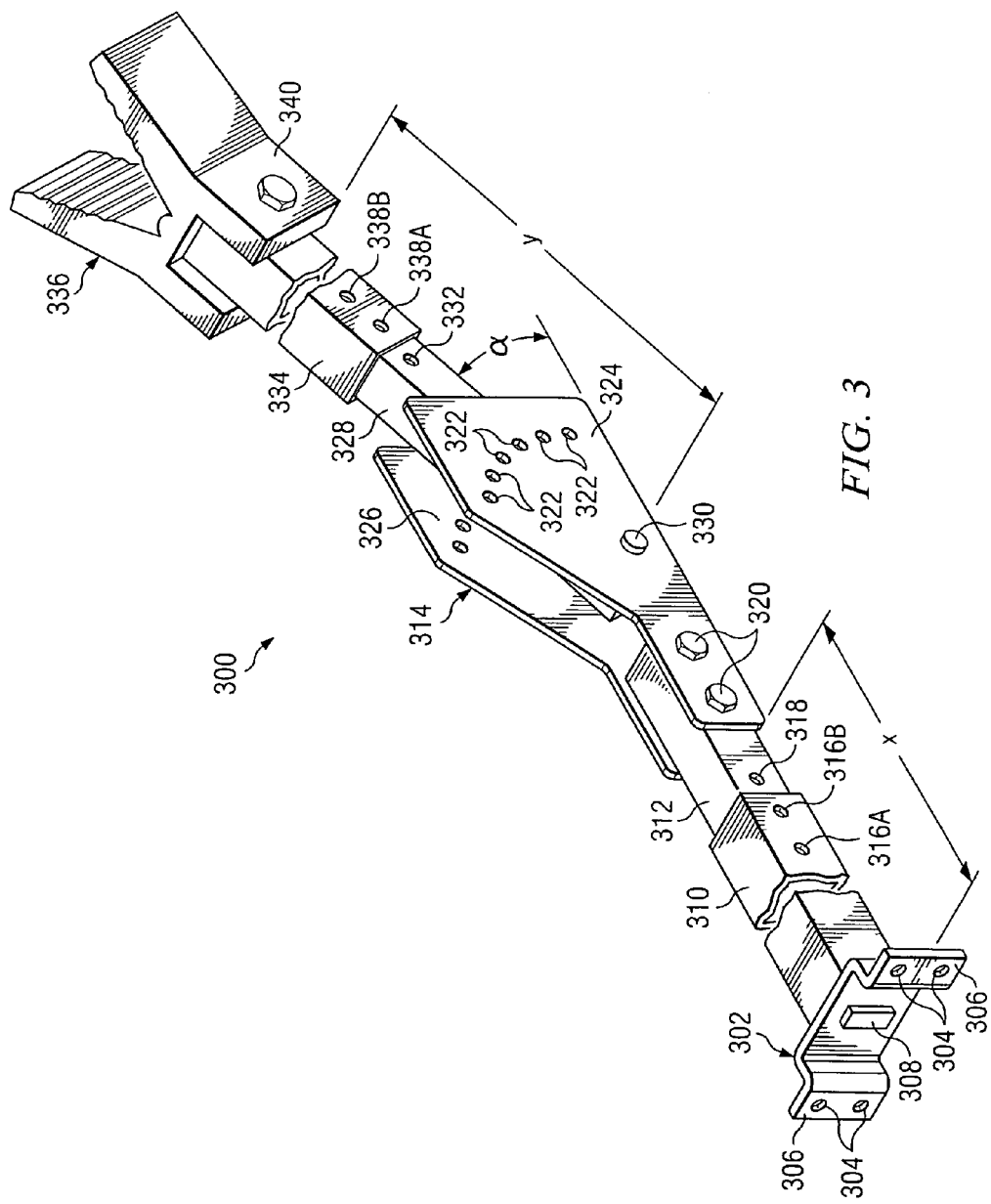
FIG. 3 is a more detailed depiction of an example variable angle outboard motor support.

FIG. 3 illustrates an example variable angle mounting brace 300. The variable angle mounting brace 300 includes a vehicle and/or trailer mount 302, which may removably attach to a trailer, such as the example boat trailer 104 of FIGS. 1, 2A, and 2B. Accordingly, the example variable angle mounting brace 300 may be employed as a variable angle outboard motor support, such as the example variable angle motor support 114 of FIG. 1. The vehicle and/or trailer mount 302 may be a bracket assembly that includes a trailer coupling, and a coupling adapted to connect to an arm extending therefrom. As described above, the example variable angle motor support 300 may be pivotally attached to the trailer 104. In one example, a ball-and-socket configuration may be incorporated into the vehicle and/or trailer mount 302 to enable an adjustable pivoting motion. In another example, the vehicle and/or trailer mount 302 may include a plurality of preconfigured mounting detents to enable adjustable attachment positions between the trailer 104 and the vehicle and/or trailer mount 302. The vehicle and/or trailer mount 302 and/or trailer coupling may include various mounting holes 304 (threaded or unthreaded), flanges 306, clamps, and/or attachment hardware (e.g., screws, rivets, bolts, etc.) to secure to the example boat trailer 104 in a rigid, pivotal, and/or adjustable manner.

In yet another example, the vehicle and/or trailer mount 302 may removably connect to a trailer hitch. For example, the vehicle and/or trailer mount 302 may be a towbar mount adapted to connect to a class I and/or class II towbar capable of accommodating light loads. Additionally, the vehicle and/or trailer mount 302 may connect to a class III towbar for heavier loads, such as for campers and/or boats. Persons of ordinary skill in the art will appreciate that a class III towbar includes a square receiving hole that is typically 2 inches square. Without limitation, the vehicle and/or trailer mount 302 may be a towing tongue and/or coupling. Persons of ordinary skill in the art will appreciate that such couplings slip over a ball mount. Couplings and/or towbar mounts may be attached to vehicles, such as cars, trucks, and/or pickup trucks. The trucks and/or pickup trucks may have a bed for hauling cargo, such as other vehicles including, but not limited to, bicycles, motorcycles, snowmobiles, and/or all terrain vehicles (ATVs), all of which may be secured for transportation by the example variable angle mounting brace 300 of FIG. 3.

In the event that a boat trailer 104 does not couple to the vehicle and/or trailer mount 302 due to, for example, particular trailer design characteristics, the example vehicle and/or trailer mount 302 and/or trailer coupling may be removed and replaced with an alternate trailer mount. Accordingly, the example variable angle mounting brace 300 includes a trailer mount fastener 308 to removably secure the trailer mount 302 to a trailer-side outer arm 310. The example vehicle and/or trailer mount 302 may also include an arm coupling to removably attach the trailer-side outer arm 310. Persons of ordinary skill in the art will appreciate that the vehicle and/or trailer mount 302 may be a universally adaptable design to accommodate many different boat trailers 104, and/or may be custom designed to accommodate a specific boat trailer.

Figure 4:
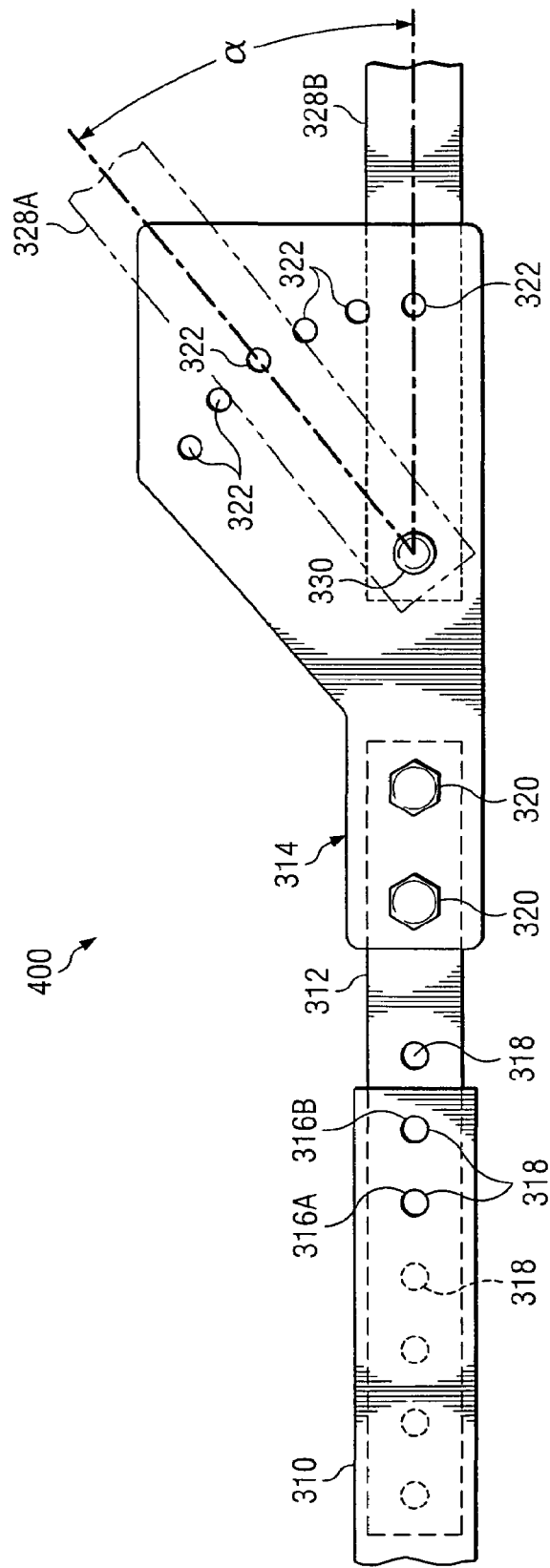
FIG. 4 is a side view of a portion of the example variable angle outboard motor support of FIG. 3.

The trailer-side outer arm 310 may include a hollow chamber to allow insertion of a trailer-side inner arm 312, thereby permitting an adjustable length "x" between the trailer mount 302 and an adjustable coupling 314. Adjustability of the length "x" may be realized via a telescoping motion between the trailer-side outer arm 310 and the trailer-side inner arm 312. Adjustment or locking holes 316A and 316B extend in a direction parallel to the "x" direction to allow insertion of threaded bolts secured with mating nuts, keyed pins, cotter pins, wire pins, tablock pins, hitch pins, and/or lynch pins. In the illustrated example, the trailer-side outer arm 310 includes two locking holes 316A and 316B, but persons of ordinary skill in the art will appreciate that any number of adjustment or locking holes may be employed. Additionally, the trailer-side inner arm 312 includes a trailer-side inner arm locking hole 318. The inner arm 312 may include a plurality of such locking holes at various locations along its length to accommodate for a plurality of discrete adjustment or locking positions that result in various lengths for "x." Such additional trailer-side inner arm 312 adjustment or locking holes 318 are hidden from view in FIG. 3 by the trailer-side outer arm 310, but are shown in FIG. 4 as dashed circles.

Persons of ordinary skill in the art will appreciate that, instead of a plurality of locking holes 316A and 316B and/or a plurality of locking holes placed through the inner arm 312, such as the trailer-side inner arm locking holes 318, telescoping positions may be adjustably secured with various other fasteners. For example, relative telescoping motion between the trailer-side inner arm 312 and the trailer-side outer arm 310 may be secured with a spring loaded pull-pin, or may be secured with a threaded locking dowel. However, the locking holes 318 are not necessary when employing the threaded locking dowel, which is typically rotated into a threaded locking hole, similar to locking holes 316A and/or 316B, but no corresponding holes are fashioned in the trailer-side inner arm 312. As such, when the threaded locking dowel is tightened, the dowel end establishes an interference fit with the trailer-side inner arm 312, thereby preventing relative motion between the trailer-side outer arm 310 and the trailer-side inner arm 312.

While the illustrated example trailer-side outer arm 310 and trailer-side inner arm 312 are shown in FIG. 3 as being substantially rectangular in shape and as having substantially rectangular profiles, persons of ordinary skill in the art will appreciate that alternate profiles and/or shapes may be employed, such as circular, triangular, square, and/or an oval profile shape. However, non-circular shapes may prevent relative rotational motion between inner and outer arms of the variable angle motor support 300. On the other hand, the example variable angle motor support 300 of FIG. 3 may employ a single arm rather than the outer arm 310 adapted to receive the inner-arm 312, which is slidably engaged with the outer arm 310 and, thus, can be telescoped into the outer arm 310.

The trailer-side inner arm 312 is attached to the adjustable coupling 314 with coupling fasteners 320. The coupling fasteners 320 may include, but are not limited to, threaded screws, threaded bolts with mating nuts and washers, welds, and/or rivets. While the illustrated example shows two coupling fasteners 320, persons of ordinary skill in the art will appreciate that any number of coupling fasteners 320 may be employed to secure the trailer-side inner arm 312 to the adjustable coupling 314 The coupling fasteners 320 connected to the trailer-side inner arm 312 (or the trailer-side outer arm if only a non-telescoping arm is employed) prevent any relative pivoting motion between the adjustable coupling 314 and the arms 310 and 312.

In the illustrated example, the adjustable coupling or joining member 314 includes a plurality of angular locking holes 322. The angular locking holes 322 extend through an adjustable coupling first side plate 324 and a second side plate 326. The first side plate 324 and the second side plate 326 are substantially parallel to each other and allow a motor-side inner arm 328 to rotate or pivot therebetween. The motor-side inner arm 328 pivots or rotates around an inner arm pivot fastener 330 to create varying angles (α) between the trailer-side inner arm 312 and the motor-side inner arm 328. While the illustrated example of FIG. 3 includes angles (α) ranging from zero (straight) to approximately 90 degrees, persons of ordinary skill in the art will appreciate that any number of additional angular locking holes 322 may permit angles (α) greater than 90 degrees. Generally speaking, additional angular locking holes 322 may allow any angle (α) greater than or equal to zero, but less than 180 degrees. The motor-side inner arm 328 includes a motor-side inner arm pivot locking hole, formed through the motor-side inner arm 328, to allow a locking fastener, pin, and/or dowel to be inserted therein that extends through any one of the plurality of locking holes 322 of the first side plate 324, the pivot locking hole, and a corresponding one of any of the plurality of locking holes 322 of the second side plate 326.

Similar to the trailer-side outer arm 310 and the trailer-side inner arm 312, the motor-side inner arm 328 and a motor-side outer arm 334 are slidable relative to one-another in a telescoping motion. The securably telescoping motion allows for varying lengths "y" between the adjustable coupling 314 and a cargo attachment assembly 336. In the illustrated example, the cargo attachment assembly 336 is a motor attachment 336 to receive, for example, an outboard motor. The motor attachment or motor brace 336, may include an arm coupling 340 to releasably secure to the outer arm 334. In the illustrated example, the arm coupling 340 includes a pin-hole through opposite sides of the motor attachment 336 to receive, for example, a threaded bolt and mating nut, a dowel, a locking fastener, etc. Alternatively, multiple arm couplings 340 may be employed on the motor attachment 336 to maintain a rigid attachment between the outer arm 334 and the motor attachment 336.

Adjustability of the length "y" may be realized via the telescoping motion and telescoping locking holes 338A and 338B, which extend in a direction parallel to the "y" direction to allow insertion of threaded bolts secured with mating nut, keyed pins, cotter pins, wire pins, tablock pins, hitch pins, and/or lynch pins. In the illustrated example, the motor-side outer arm 334 includes two locking holes 338A and 338B. However, any number of locking holes may be employed. On the other hand, similar to the trailer-side arms 310 and 312 discussed above, the motor-side inner arm 328 may not include a telescoping feature and, thus, may not include a motor-side outer arm 334. In one example, the motor-side inner arm 328 may extend from the arm pivot fastener 330 to the motor attachment 336 without a telescoping outer arm.

Returning to the example variable angle motor support 300 of FIG. 3, the motor-side inner arm 328 includes a motor-side inner arm locking hole 332. However, a plurality of locking holes are placed through the inner arm 328 at various locations along its length to accommodate for a plurality of discrete locking positions that result in various lengths for "y."

FIG. 4 illustrates a side view 400 of the example adjustable coupling 314 with dashed lines to illustrate corresponding connectivity to the trailer-side inner arm 312, and two example positions of the motor-side inner arm 328A and 328B. The inner arm pivot fastener 330 allows the motor-side inner arm 328 to pivot to a plurality of angles (α) based on which of the plurality of angular locking holes 322 are used. Similar to the locking holes 316A, 316B, 338A, and 338B, the angular locking holes 322 may secure the motor-side inner arm 328 via various fasteners, such as spring loaded pull-pins, threaded bolts with mating nuts, keyed pins, cotter pins, wire pins, tablock pins, hitch pins, lynch pins, and/or threaded locking dowels to create a secured interference fit between the adjustable coupling 314 and the motor-side inner arm 328.

As discussed above, persons of ordinary skill in the art will appreciate that an angular range (α) may be increased with additional of angular locking holes 322. Furthermore, alternate profile shapes of the adjustable coupling 314 may allow for the addition of angular locking holes 322 without limitation.

Although the above teachings have been illustrated in connection with certain embodiments, there is no intent to limit the invention to such embodiments. On the contrary, the subject matter of this application is to cover all modifications and embodiments fairly falling within the scope of the appended claims either literally or under the doctrine of equivalents.

I claim:
1. An outboard motor support comprising:
   a trailer mount attachable to a trailer;
   a first telescoping arm extending from the trailer mount;

a second telescoping arm to extend from an outboard motor and comprising an outboard motor mount said first and second telescoping arms each having an adjustable length;

said outboard motor mount comprising a housing having a first end releasably coupled to the second telescoping arm and a second end having a channel formed therein, the channel facing away from said second telescoping arm and being sized to secure to a portion of the outboard motor; and a pivotally adjustable coupling connecting the first telescoping arm to the second telescoping arm to prevent interference of a boat portion with the outboard motor support.

2. An outboard motor support as defined in claim 1, wherein the first telescoping arm is rigidly attachable to the trailer mount, pivotally attachable to the trailer mount, or adjustably attachable to the trailer mount.

3. An outboard motor support as defined in claim 1, wherein the outboard motor mount is releasably attachable to at least one of an outboard motor body or an outboard motor shank.

4. An outboard motor support as defined in claim 1, wherein at least a portion of the housing of the outboard motor mount is padded.

5. An outboard motor support as defined in claim 1, wherein the pivotally adjustable coupling has a first end rigidly connected to the first telescoping arm and a second end adjustably connected to the second telescoping arm.

6. An outboard motor support as defined in claim 5, wherein the second end further comprises at least one of angular locking holes or a threaded pivot.

7. An outboard motor support as defined in claim 1, wherein the first telescoping arm or the second telescoping arm is configured to provide a plurality of telescoping positions.

8. An outboard motor support as defined in claim 7, wherein the first telescoping arm or the second telescoping arm comprises a threaded fastener or a plurality of pre-determined pin holes associated with the plurality of telescoping positions.

9. An outboard motor support as defined in claim 1, wherein the boat portion comprises at least one of a transom, a boat corner, a boat hull, or a boat peripheral.

10. An outboard motor support as defined in claim 1, further comprising a flange extending from the housing of the outboard motor mount to matingly engage the outboard motor and to prevent pivotal movement of the outboard motor.

11. An outboard motor support as defined in claim 1, wherein the outboard motor mount is collinearly mounted to the second telescoping arm.

12. An outboard motor support comprising:
a bracket assembly comprising a trailer coupling removably attachable to a marine vehicle trailer and a first rigid arm coupling;
an outboard motor brace comprising a motor connector and a second rigid arm coupling the motor connector comprising a housing having flanges extending from the housing to define a rearwardly facing channel configured to matingly couple to a portion of the outboard motor therein;
a first rigid telescoping arm removably attachable to the first rigid arm coupling at a first end;
a second rigid telescoping arm removably attachable to the second rigid arm coupling, said first and second rigid telescoping arms each having an adjustable length; and an adjustable joining member comprising a first end to non-pivotally and removably attach the first rigid telescoping arm, and a lockable second end to pivotally and removably attach the second rigid telescoping arm to prevent interference of a boat portion with the outboard motor support.

13. An outboard motor support as defined in claim 12, wherein the first rigid telescoping arm is adjustably attachable to the first rigid arm coupling.

14. An outboard motor support as defined in claim 12, wherein the lockable second end of the adjustable joining member comprises a plurality of angular locking holes and a pivot fastener, and wherein the second rigid telescoping arm is pivotable around the pivot fastener.

15. An outboard motor support as defined in claim 14, wherein the second rigid telescoping arm is non-pivotally secured to the adjustable joining member with at least one of the angular locking holes.

16. An outboard motor support as defined in claim 15, wherein at least one of the plurality of angular locking holes is adapted to receive at least one of a threaded bolt and mating nut, a keyed pin, a cotter pin, a wire pin, a tablock pin, a hitch pin, or a lynch pin.

17. An outboard motor support as defined in claim 12, wherein the boat portion comprises at least one of a transom, a boat corner, a boat hull, or a boat peripheral.

18. An outboard motor support as defined in claim 12, wherein the flanges releasably engage the outboard motor to substantially prevent movement of the outboard motor relative to the outboard motor brace.

19. A method to secure an outboard motor comprising:
attaching a trailer mount to a marine vehicle trailer, releasably securing the trailer mount to a first end of a first rigid telescoping arm, wherein a second end of the first rigid telescoping arm is securable to a first end of an adjustable coupling;
attaching an outboard motor mount to an outboard motor, the outboard motor mount comprising a housing having flanges extending from the housing to define a rearwardly facing channel configured to releasably secure the outboard motor to the outboard motor mount, releasably securing said housing to a first end of a second rigid telescoping arm, and a second end of the second rigid telescoping arm pivotally securable to a second end of the adjustable coupling, wherein the second rigid telescoping arm comprises inner and outer arms; and
pivotally securing the second rigid telescoping arm to the adjustable coupling to prevent interference of a boat portion with at least one of the first or second rigid telescoping arm.

20. A method to secure an outboard motor as defined in claim 19, wherein pivotally securing comprises engaging at least one of a plurality of angular locking holes.

21. A method to secure an outboard motor as defined in claim 20, wherein engaging the at least one of the plurality of angular locking holes comprises engaging at least one of a threaded bolt and mating nut, a keyed pin, a cotter pin, a wire pin, a tablock pin, a hitch pin, or a lynch pin.

22. A method to secure an outboard motor as defined in claim 20, wherein the at least one of the plurality of angular locking holes is alignable with a locking hole of the second rigid telescoping arm.

23. A method to secure an outboard motor as defined in claim 19,
 wherein attaching the outboard motor mount to the outboard motor comprises releasably attaching the outboard motor mount to at least one of an outboard motor body or an outboard motor shank.

24. A method to secure an outboard motor as defined in claim 19, wherein the boat portion comprises at least one of a transom, a boat corner, a boat hull, or a boat peripheral.

* * * * *